United States Patent [19]

Schiher et al.

[11] 4,267,227
[45] May 12, 1981

[54] PRESS FABRIC RESISTANT TO WAD BURNING

[75] Inventors: Stanley C. Schiher, Troy; Armen Renjilian, Colonie, both of N.Y.

[73] Assignee: Albany International Corp., Albany, N.Y.

[21] Appl. No.: 111,367

[22] Filed: Jan. 11, 1980

[51] Int. Cl.³ .............................................. B32B 5/02
[52] U.S. Cl. ..................................... 428/234; 428/96; 428/235; 428/246; 428/252; 428/280; 428/287; 428/300; 428/920; 428/921
[58] Field of Search .................... 428/85, 96, 234, 235, 428/246, 252, 280, 299, 300, 301, 920, 921, 290, 447, 474, 287; 162/358, 359

[56] References Cited

U.S. PATENT DOCUMENTS

| | | | |
|---|---|---|---|
| 4,070,519 | 1/1978 | Lefkowitz et al. .................... | 428/235 |
| 4,119,753 | 9/1978 | Smart .................................... | 428/235 |
| 4,151,323 | 4/1979 | Christie ................................ | 428/235 |
| 4,162,190 | 7/1979 | Ashworth ............................. | 428/280 |
| 4,172,170 | 10/1979 | Foye ...................................... | 428/235 |
| 4,187,618 | 2/1980 | Diehl ..................................... | 428/235 |
| 4,190,695 | 2/1980 | Niederhauser ....................... | 428/235 |

*Primary Examiner*—James J. Bell
*Attorney, Agent, or Firm*—Kane, Dalsimer, Kane, Sullivan and Kurucz

[57] ABSTRACT

The disclosure is of a composite papermakers felt made up of a base layer of a textile and a surface layer of high-temperature resistant fibers coated on the surface exposed portions with a high-temperature resistant, water-insoluble, synthetic, polymeric resin. The felt is useful in the wet press section of a papermaking machine. The disclosure is also of a method of manufacturing the felt of the invention.

4 Claims, 3 Drawing Figures

PRESS FABRIC RESISTANT TO WAD BURNING

BACKGROUND OF THE INVENTION

1. Field of the Invention

The invention relates to papermakers felts and methods of their manufacture and more particularly relates to felts useful in the press section of a papermaking machine.

2. Brief Description of the Prior Art

The modern papermaker employs a highly sophisticated machine to make paper, which is named rather appropriately a "papermaking machine". The modern papermaking machine is in essence a device for removing water from the paper furnish. The water is removed sequentially in three stages or sections of the machine. In the first or forming section, the furnish is deposited on a moving forming wire and water drained through the wire to leave a paper sheet or web having a solids content of circa 18 to 25 percent by weight. The formed web is carried into a wet press felt section and passed through one or more nip presses on a moving press felt to remove sufficient water to form a sheet having a solids content of 36 to 44 percent by weight. This sheet is then transferred to the dryer section of the papermaking machine where dryer felts press the paper sheet against hot, steam-heated dryer cylinders to obtain a 92 to 96 percent solids content.

The clothing employed on the paper making machine must perform a widely diverse range of functions, according to the position on the machine, i.e.; forming, press or dryer section. In view of the diversity of functions, the clothing for use in each section of the machine must be manufactured to meet specific design requirements essential to the particular section. In the absence of meeting the specific felt design requirements demanded in each section of the machine, the overall operation of the machine will be unsatifactory. Optimum operating lives of the felts will not be achieved, product quality may be adversely affected, machine speeds may be lowered or drying efficiency may be impeded.

Prior to the present invention, one of the problems associated with papermaking efficiency has been "wad burning" of press felt fabrics in the press section of the papermaking machine. Wad burning occurs when a wad of the formed web entering a press nip in the wet press section lodges at the entrance to the nip. The lodged wad creates a high frictional force against the press felt fabric. The heat of friction generated may melt and fuse synthetic fibers in the surface of the press felt, thereby causing areas in the felt which do not allow water to drain. Wad burning damage has become much more prevalent with synthetic felts used on hihgly loaded presses (above 600 psi or 42.2 kg/cm$^2$) usually found in the second and third positions of the wet press section. Wad burning damage can be reduced to some degree by fabricating the press felts from high temperature resistant materials or by including high proportions of wool in the fabric. However, wad burning prior to the present invention has not been completely eliminated as a problem since even high temperature resistant fibers such as polyaramid fibers are degraded by wad burning.

By the method of the present invention, synthetic fiber surfaces containing press felt fabrics, particularly of the "Batt-on-Base" type construction, i.e.; press fabrics comprising a textile fabric base and a batt surface attached by needling, are made resistant to wad burning. The felts of the invention also exhibit enhanced abrasion resistance, reduced fiber shedding and overall longer operating lives.

SUMMARY OF THE INVENTION

The invention comprises a wad burning resistant wet press fabric, which comprises;

a base layer of a textile, a surface layer for receiving a wet paper sheet, affixed to the base layer by needling, said surface layer comprising non-woven textile fibers of a high-temperature resistant, synthetic, polymeric resin; and a coating of a high-temperature resistant, synthetic, water-insoluble, polymeric resin on the surface exposed portions of said fibers.

The invention also comprises the method of treating a wet press fabric of synthetic, high-temperature resistant, polymeric resin fibers to render it resistant to wad burning, which comprises; coating the exposed surface fibers of the fabric with a high-temperature resistant, synthetic, polymeric resin.

The term "high temperature resistant" as used herein means the material, resin, fibers or yarn will not significantly degrade after exposure to temperatures of at least about 400° F. to about 950° F. for extended periods of time.

The wet press fabrics of the invention are useful for the fabrication of wet press felts employed in the wet press section of a papermaking maching.

DETAILED DESCRIPTION OF THE PREFERRED EMBODIMENTS OF THE INVENTION

Figure 1:
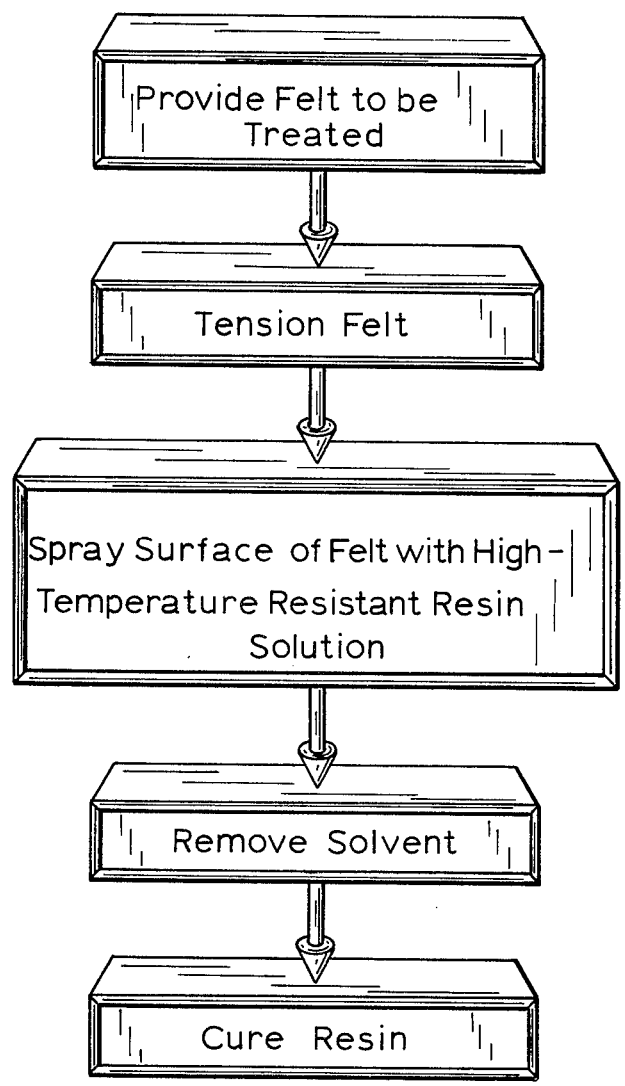
FIG. 1 is a schematic flow chart setting forth the steps of a preferred method of the invention.

The papermakers felts of the invention may be fabricated by the steps shown in FIG. 1, a flow diagram of a preferred method. In an initial step, one provides a textile fabric base, which may be a conventional fabric of interwoven machine direction (warp) and cross-machine direction (weft) textile yarns. The yarns may be spun yarns, spun from synthetic or natural staple fibers such as staple fibers of wool, cotton, polyolefins, polyamides, polyesters, mixtures thereof and the like.

The particular weave employed in providing a woven base is not critical and any conventional felt weave may be employed. Thus the textile base may be a single layer or a multi-layered weave construction and may include filling yarns or picks to control permeability of the fabric. In the preferred wet press felt fabrics of the invention, there will be needled to one or more surfaces of the woven textile base a batt of non-woven staple fibers of a high-temperature resistant, synthetic polymeric resin. Representative of such fibers are fibers of carbon, polyaramids, polybenzimidazoles, novaloid, polyoxyadiazoles, mixtures thereof and the like.

Techniques for needling composite structures are so well known that they need not be recited herein; see for example the needling techniques described in U.S. Pat. No. 2,059,132.

Preferably, the needled fabrics employed to fabricate the wet press fabrics of the invention are mechanically felted when provided.

In accordance with the embodiment process shown in FIG. 1, the fabric to be treated is placed under tension, substantially equal to the tension exerted on the fabric during operation on the papermaker's machine. This will open the surface of the fabric, exposing portions of the needled fibers at the fabric surface. Generally a tension within the range of from about 10 to 50 lbs./in. is advantageous.

In the next step of the process of the invention, the needled fibers exposed on the surface of the fabric are sprayed with a solution of a high-temperature resistant, synthetic, water insoluble, polymeric resin. Representative of such resins are polysulfones, organopolysilicones, polyphenylene sulfide, polyepoxides, polyesterimide, polyamide-imide, polyimides, polyquinozalines, mixtures thereof and like high-temperature resistant resins. The invention is not limited to the use of a single resin, but includes also a combination of resins as separate spray layers or as mixtures.

Preferred resin spray coatings for preparing the fabrics of the invention are the polyamide-imide polymers, more particularly described as polytrimellitamides, being prepared by the reaction of aromatic diamines with aryl halide derivatives of trimellitic anyhdrides. The methods of their preparation are well known; see for example the methods of U.S. Pat. Nos. 3,049,518 and 3,260,691. Spray coating compositions of the preferred polytrimellitamide are generally well known and are commercially available (see for example the compositions of polytrimellitamide polymer enamel described in U.S. Pat. Nos. 3,451,848 and 3,843,587.)

The spray application of resin may be carried out employing conventional spray apparatus, so as to completely, homogenously and evenly coat the fibers exposed on the surface of the press felt fabric. The amount of resin applied is not critical, so long as a major proportion of the exposed portions of the surface fibers are covered. Generally, the proportion of resin has a weight which will increase the weight of the fabric by from about 1 to 5 percent. It is important to the method of the invention that the applied resin solution not penetrate below the fabric surface so as to impregnate the underlying woven or base layer. If the resin does penetrate to the base layer, upon curing it will stiffen the fabric beyond acceptable limits for use on a papermaking machine. This unacceptable stiffness does not occur if the resin solution does not penetrate beyond the needled on layer of non-woven fibers.

Following the spray application of the resin solution, the solvent is removed. This may be carried out by exposure of the resin applied fabric to heat, to drive off the solvent and leave a residue of resin on the fiber surfaces. The resin is then cured to a tack-free state by the application of heat, sufficient to affect the desired cure. The temperature necessary for curing the resin will depend, of course, on the nature of the resin. The appropriate temperature will be appreciated by those skilled in the art.

Figure 2:
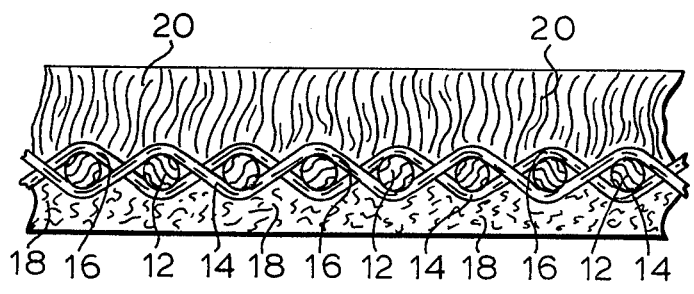
FIG. 2 is a cross-sectional side elevation of an embodiment press fabric of the invention.

Referring now to FIG. 2, a cross-section side elevation of an embodiment press felt fabric of the invention prepared according to the above-described process of the invention may be seen. The fabric includes a base textile material defined by warp yarns 12 and filler yarns 14 and 16. The warp and filler yarns are woven on a loom in any conventional manner and may be formed of any material normally employed in the manufacture of papermaking felts. It is contemplated that wool and suitable synthetic materials will be utilized as the warp and filler yarns; however, the materials that define these yarns and the manner of weaving thereof form no part of the present invention.

Following the conventional splicing or tubular weaving of the warp and filler yarns 12, 14 and 16, the endless belt that defines the felt is placed on a conventional needling machine and the base materials that define the weave have a nonwoven batting material needled on one or both sides thereof, as indicated at 18 and 20, the needled material 20 defining the face of the felt and the needled material 18 defining the back side thereof. The batts that are needled into the base weave are normally formed of a blend of wool and synthetic fibers. It is understood, of course, that the batt material that defines the surfaces of the felt may be formed of any conventional high-temperature resistant fibers. The number of layers of the batt material as needled into the base weave will also be determined by the end use of the felt.

Figure 3:
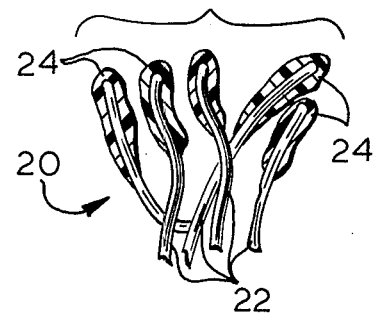
FIG. 3 is an enlarged view of the surface fibers found in the fabric of FIG. 2.

FIG. 3 is an enlarged view of a portion of the layer 20 shown in FIG. 2 and shows a plurality of the individual high-temperature resistant fibers 22, coated on their surface exposed portions with a high-temperature resistant resin 24 as described previously.

The fabric of the invention may be joined at the ends by a fold-back pin seam to make an endless wet press felt. The felt is easily installed in the wet press section of a paper-making machine. The felt operates at high speeds and at elevated temperatures. The endless felt tracks well, shows excellent dimensional stability and is highly resistant to abrasion. In particular, the felt shows excellent abrasion resistance and resistance to wad burning.

The following example sets forth the manner and process of making and using the invention and sets forth the best mode comtemplated by the inventor of carrying out the invention.

Preparation

Equal weights of a polyamide-imide resin (XWE-960, Schenectedy Chemical Co.) and N-methyl pyrrolidone are admixed in an appropriate vessel to obtain a sprayable resin composition.

EXAMPLE

A wet press felt is provided, constructed of polyaramid warp and filler multifilamat yarns (yarns prepared from a polymer of m-phenylenediamine and isophthaloyl chloride (Nomex, E. I. DuPont de Nemours and Co., Wilmington, Delaware) to which a surface batt of non-woven Nomex fibers had been needled. The felt is tensioned and sprayed on the batt side with the above-described Preparation in two passes. The sprayed felt is then passed through a drying oven at a temperature of 360° F., at a rate of 30 feet/minute for a drying time of 20 minutes. The dry felt is then passed through the oven a second time at 360° F. for 10 additional minutes exposure at a speed of 10 feet/minute to cure the dry resin to a tack-free state. The felt is then washed and readied for installation on a papermaking machine.

Similarly, repeating the above procedure but replacing the polyimide as used therein with a polysulfone or an organopolysilicone or a polyphenylene sulfide or a polyepoxide or a polyester-imide or a polyquinoxaline, or a polyimide, a fabric of the invention is obtained.

We claim:

1. A wad burning resistant wet press fabric, which comprises:
   a base layer of a textile;
   a surface layer for receiving a wet paper sheet, affixed to the base layer by needling, said surface layer comprising non-woven textile fibers of a high-temperature resistant, synthetic, polymeric resin; and
   a coating of a high-temperature resistant, synthetic, water-insoluble, polyamide-imide polymeric resin on the surface exposed portions of said fibers.

2. The fabric of claim 1 wherein the base layer is a woven fabric.

3. The fabric of claim 1 wherein the fibers are polyaramid fibers.

4. A papermakers felt, which comprises;
   a base layer of interwoven, machine direction (warp) and cross-machine direction (weft) textile yarns; and
   a surface layer for receiving a wet paper sheet affixed to the base layer, said surface layer comprising a non-woven batt of high-temperature resistant staple textile fibers needled to the base layer; and
   a coating of a high-temperature resistant, water-insoluble, synthetic, polyamide-imide polymeric resin limited to the surface exposed portions of the fibers in the surface layer.

* * * * *